United States Patent
Hayes et al.

(10) Patent No.: US 11,962,664 B1
(45) Date of Patent: *Apr. 16, 2024

(54) CONTEXT-BASED DATA VALUATION AND TRANSMISSION

(71) Applicant: GHOST AUTONOMY INC., Mountain View, CA (US)

(72) Inventors: John Hayes, Mountain View, CA (US); Volkmar Uhlig, Cupertino, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,921

(22) Filed: Jan. 16, 2023

Related U.S. Application Data

(63) Continuation of application No. 17/741,941, filed on May 11, 2022, now Pat. No. 11,558,483, which is a continuation of application No. 17/342,952, filed on Jun. 9, 2021, now Pat. No. 11,375,034, which is a continuation of application No. 16/926,719, filed on Jul. 12, 2020, now Pat. No. 11,095,741.

(60) Provisional application No. 62/872,903, filed on Jul. 11, 2019.

(51) Int. Cl.
| | |
|---|---|
| *H04L 67/12* | (2022.01) |
| *G06F 16/22* | (2019.01) |
| *G07C 5/00* | (2006.01) |
| *G07C 5/08* | (2006.01) |
| *H04L 45/24* | (2022.01) |
| *H04L 67/2895* | (2022.01) |
| *H04L 67/56* | (2022.01) |

(52) U.S. Cl.
CPC .......... *H04L 67/56* (2022.05); *G06F 16/2272* (2019.01); *G07C 5/008* (2013.01); *G07C 5/08* (2013.01); *G07C 5/0841* (2013.01); *H04L 45/24* (2013.01); *H04L 67/12* (2013.01); *H04L 67/2895* (2013.01)

(58) Field of Classification Search
None
See application file for complete search history.

(56) References Cited

U.S. PATENT DOCUMENTS

| | | | | |
|---|---|---|---|---|
| 6,266,442 | B1 * | 7/2001 | Laumeyer | G06V 10/443 382/104 |
| 7,421,334 | B2 * | 9/2008 | Dahlgren | G01C 21/3691 701/408 |
| 7,616,642 | B2 * | 11/2009 | Anke | H04L 47/32 370/395.42 |
| 8,140,358 | B1 * | 3/2012 | Ling | G07C 5/008 340/439 |
| 8,370,392 | B1 * | 2/2013 | Hunt | H04L 67/06 707/791 |
| 8,704,682 | B1 * | 4/2014 | Chau | G01C 21/3453 340/995.13 |

(Continued)

*Primary Examiner* — Backhean Tiv

(57) ABSTRACT

Context-based data valuation and transmission, including: acquiring sensor data from a plurality of sensors of the autonomous vehicle, wherein the sensor data comprises a plurality of portions and the plurality of sensors comprises at least two cameras; determining, for each portion of the sensor data, a value based on one or more conditions under which the sensor data was captured; determining, based on the values for the sensor data, an upload policy; and transmitting, based on the upload policy, one or more portions of the sensor data to a server.

20 Claims, 9 Drawing Sheets

(56) References Cited

U.S. PATENT DOCUMENTS

| | | | | |
|---|---|---|---|---|
| 8,989,954 B1* | 3/2015 | Addepalli | B60W 50/10 | 701/32.7 |
| 9,008,890 B1* | 4/2015 | Herbach | G05D 1/0212 | 340/436 |
| 9,883,258 B2* | 1/2018 | Yun | H04Q 9/00 | |
| 10,185,999 B1* | 1/2019 | Konrardy | G06Q 40/08 | |
| 10,293,818 B2* | 5/2019 | Kroop | B60W 60/0015 | |
| 10,303,045 B1* | 5/2019 | Sato | G06F 3/038 | |
| 10,380,694 B1* | 8/2019 | Grant | G08G 1/205 | |
| 10,388,089 B1* | 8/2019 | Civgin | G07C 5/0816 | |
| 10,430,603 B2* | 10/2019 | Hrabak | G06F 21/6218 | |
| 10,430,883 B1* | 10/2019 | Bischoff | G06Q 20/102 | |
| 10,535,207 B1* | 1/2020 | Goluguri | G07C 5/008 | |
| 10,593,109 B1* | 3/2020 | Floyd | G06T 17/05 | |
| 10,599,150 B2* | 3/2020 | Graham | G06V 20/56 | |
| 10,599,155 B1* | 3/2020 | Konrardy | B60W 10/04 | |
| 10,599,929 B2* | 3/2020 | Cuban | G06T 7/70 | |
| 10,614,688 B1* | 4/2020 | Pachikov | G08B 31/00 | |
| 10,627,823 B1* | 4/2020 | Kim | G06V 20/56 | |
| 10,632,992 B2* | 4/2020 | Minster | G08G 1/166 | |
| 10,726,642 B1* | 7/2020 | Goluguri | G06Q 20/308 | |
| 10,769,953 B1* | 9/2020 | Salles | G08G 1/0112 | |
| 10,816,346 B2* | 10/2020 | Wheeler | G06F 18/22 | |
| 10,855,753 B2* | 12/2020 | Kallakuri | H04L 69/24 | |
| 11,016,797 B2* | 5/2021 | Hayes | G06F 9/45558 | |
| 11,030,031 B2* | 6/2021 | Hayes | G06F 11/0721 | |
| 11,041,958 B2* | 6/2021 | Li | G01S 7/4034 | |
| 11,068,295 B2* | 7/2021 | Hayes | G06F 11/0751 | |
| 11,095,741 B2* | 8/2021 | Hayes | G07C 5/08 | |
| 11,176,007 B2* | 11/2021 | Hayes | G06F 11/2007 | |
| 11,254,325 B2* | 2/2022 | Milton | G07C 5/008 | |
| 11,375,034 B2* | 6/2022 | Hayes | G06F 21/53 | |
| 11,558,483 B2* | 1/2023 | Hayes | H04L 45/24 | |
| 2007/0038351 A1* | 2/2007 | Larschan | G06Q 10/06 | 701/33.4 |
| 2011/0098880 A1* | 4/2011 | Basir | G07C 5/085 | 701/31.4 |
| 2011/0196571 A1* | 8/2011 | Foladare | G08G 1/207 | 701/31.4 |
| 2012/0010906 A1* | 1/2012 | Foladare | G06Q 40/08 | 705/4 |
| 2013/0275214 A1* | 10/2013 | Kote | G06Q 30/0255 | 705/14.53 |
| 2014/0050085 A1* | 2/2014 | Hong | H04L 47/821 | 370/230 |
| 2015/0088335 A1* | 3/2015 | Lambert | G06N 7/01 | 701/1 |
| 2015/0187019 A1* | 7/2015 | Fernandes | G06Q 40/08 | 705/4 |
| 2015/0244826 A1* | 8/2015 | Stenneth | H04L 67/568 | 709/213 |
| 2015/0281651 A1* | 10/2015 | Kaushik | H04N 21/2146 | 348/148 |
| 2016/0033963 A1* | 2/2016 | Noh | G05D 1/0282 | 701/2 |
| 2017/0086054 A1* | 3/2017 | Azevedo | H04W 4/70 | |
| 2017/0131716 A1* | 5/2017 | Brekke | G01C 21/20 | |
| 2018/0088571 A1* | 3/2018 | Weinstein-Raun | G05D 1/0027 | |
| 2018/0157918 A1* | 6/2018 | Levkova | G06V 10/454 | |
| 2018/0272963 A1* | 9/2018 | Meyhofer | G01S 17/931 | |
| 2018/0341766 A1* | 11/2018 | Anagnostopoulos | G06V 40/20 | |
| 2018/0375939 A1* | 12/2018 | Magalhães de Matos | H04L 41/12 | |
| 2019/0026886 A1* | 1/2019 | Ferguson | G05D 1/0027 | |
| 2019/0220014 A1* | 7/2019 | Bradley | G05D 1/0238 | |
| 2019/0316913 A1* | 10/2019 | Golov | G06V 20/584 | |
| 2019/0347695 A1* | 11/2019 | Jorge | G06Q 30/0261 | |
| 2019/0378363 A1* | 12/2019 | Becker | G05D 1/0221 | |
| 2020/0017117 A1* | 1/2020 | Milton | G08G 1/0112 | |
| 2020/0019173 A1* | 1/2020 | Chen | G08G 1/096725 | |
| 2020/0033859 A1* | 1/2020 | Xiao | G01S 17/42 | |
| 2020/0057894 A1* | 2/2020 | Sambo | G06T 7/20 | |
| 2020/0077240 A1* | 3/2020 | Bansal | H04W 4/44 | |
| 2020/0148201 A1* | 5/2020 | King | G08G 1/166 | |
| 2020/0209867 A1* | 7/2020 | Valois | G01S 7/4808 | |
| 2020/0225662 A1* | 7/2020 | Dev | G05D 1/0253 | |
| 2020/0250902 A1* | 8/2020 | Golov | B60R 21/0136 | |
| 2020/0264632 A1* | 8/2020 | Sugimoto | G05D 1/0276 | |
| 2020/0326967 A1* | 10/2020 | Hayes | G06F 9/45558 | |
| 2020/0327023 A1* | 10/2020 | Hayes | G06F 13/4022 | |
| 2020/0334099 A1* | 10/2020 | Hayes | G06F 11/0721 | |
| 2020/0409364 A1* | 12/2020 | Agrawal | G07C 5/008 | |
| 2021/0011908 A1* | 1/2021 | Hayes | G06N 20/00 | |
| 2021/0012220 A1* | 1/2021 | Hayes | G06N 5/025 | |
| 2021/0014323 A1* | 1/2021 | Hayes | G07C 5/008 | |
| 2021/0306437 A1* | 9/2021 | Hayes | G07C 5/08 | |
| 2022/0272172 A1* | 8/2022 | Hayes | G07C 5/0841 | |

* cited by examiner

CONTEXT-BASED DATA VALUATION AND TRANSMISSION

CROSS-REFERENCE TO RELATED APPLICATIONS

This is a continuation application for patent entitled to a filing date and claiming the benefit of earlier-filed U.S. Pat. No. 11,558,483, issued Jan. 17, 2023, which is a continuation of U.S. Pat. No. 11,375,034, issued Jun. 28, 2022, which is a continuation of U.S. Pat. No. 11,095,741, issued Aug. 17, 2021, which claims priority from U.S. Provisional Patent Application No. 62/872,903, filed Jul. 11, 2019, each of which is hereby incorporated by reference in their entirety.

BACKGROUND

Field of the Invention

The field of the invention is data processing, or, more specifically, methods, apparatus, autonomous vehicles, and products for value-based data transmission in an autonomous vehicle.

SUMMARY

Value-based data transmission in an autonomous vehicle, comprising: acquiring sensor data from a plurality of sensors of the autonomous vehicle, the sensor data comprising a plurality of portions; determining, for each portion of the sensor data, a value; determining, based on the values for the sensor data, an upload policy; and transmitting, based on the upload policy, one or more portions of the sensor data to a server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
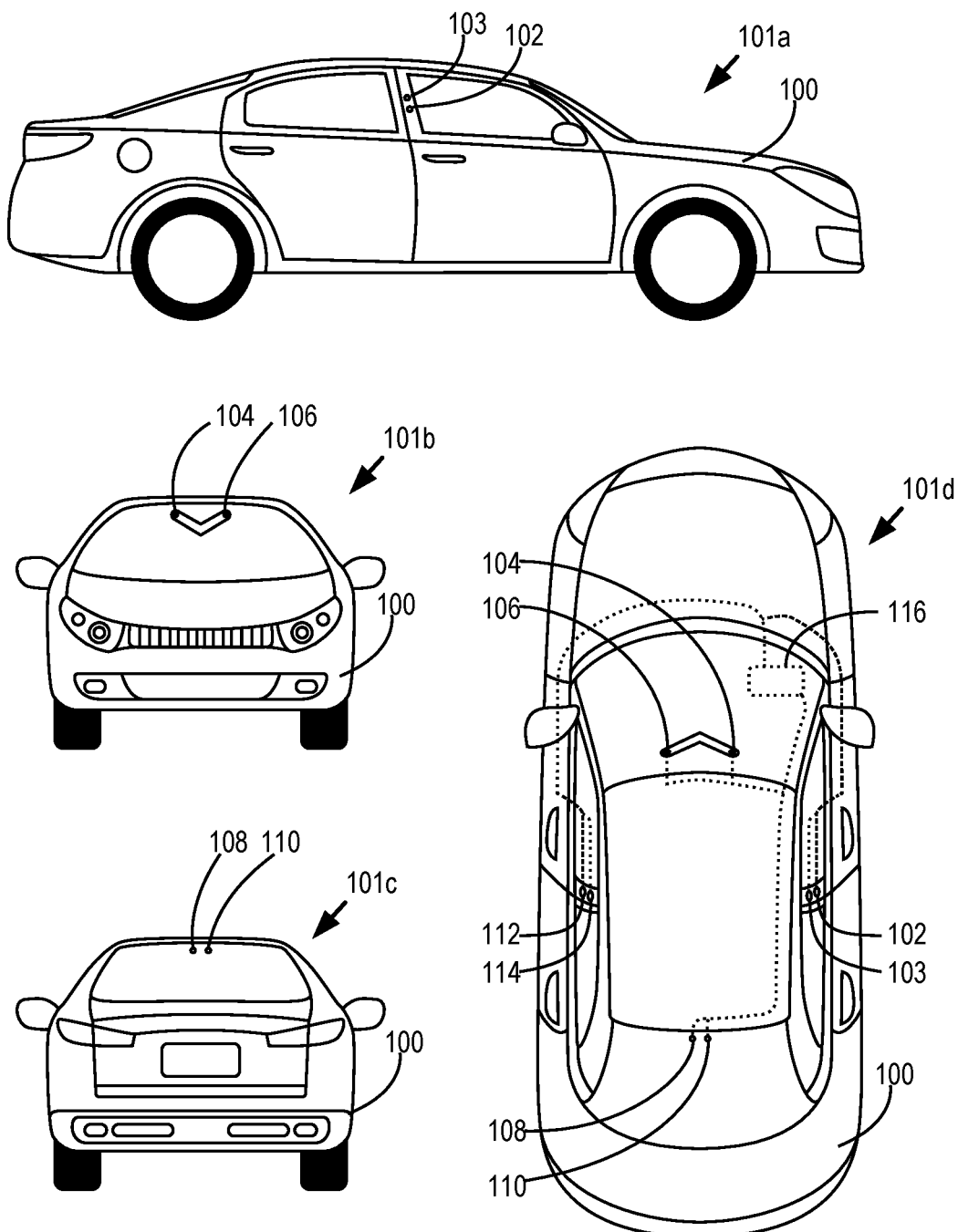
FIG. 1 shows example views of an autonomous vehicle for value-based data transmission in an autonomous vehicle.

Value-based data transmission in an autonomous vehicle may be implemented in an autonomous vehicle. Accordingly, FIG. 1 shows multiple views of an autonomous vehicle 100 configured for value-based data transmission in an autonomous vehicle according to embodiments of the present invention. Right side view 101a shows a right side of the autonomous vehicle 100. Shown in the right side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine a operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for value-based data transmission in an autonomous vehicle may also include other vehicles, including motorcycles, planes, helicopters, unmanned aerial vehicles (UAVs, e.g., drones), or other vehicles as can be appreciated. Moreover, it is understood that additional cameras or other external sensors may also be included in the autonomous vehicle 100.

Value-based data transmission in an autonomous vehicle in accordance with the present invention is generally implemented with computers, that is, with automated computing machinery. For further explanation, therefore, FIG. 2 sets forth a block diagram of automated computing machinery comprising an exemplary automation computing system 116 configured for value-based data transmission in an autonomous vehicle according to embodiments of the present invention. The automation computing system 116 of FIG. 2 includes at least one computer Central Processing Unit (CPU) package 204 as well as random access memory 206 ('RAM') which is connected through a high speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors as can be appreciated. Although the sensors 212 are shown as being external to the automation computing system 116, it is understood that one or more of the sensors 212 may reside as a component of the automation computing system 212 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 214.

Stored in RAM 206 is an automation module 220. The automation module 220 may be configured to process sensor data from the sensors 212 to determine one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222. The autonomous vehicle control systems 223 are configured to affect the movement and operation of the autonomous vehicle 100. For example, the autonomous vehicle control systems 223 may turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor data 212 (e.g., sensor data 212 having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a server 227. Such operations can include filtering, compression, encoding, decoding, or other operations as can be appreciated. The data processing module 226 may then communicate the processed and stored sensor data to the server 227.

As an example, the data collection module 224 may acquire sensor data from the plurality of sensors 212 of the autonomous vehicle 100. The sensor data may include image, audio, and/or video data from camera sensors 212, GPS data from a GPS radio sensor 212, acceleration data from an accelerometer sensor 212, or other sensor as can be appreciated. The sensor data from a particular sensor 212 may comprise contextual metadata describing a time, location, or other information associated with a context in which the sensor data was captured. The contextual metadata for a particular sensor 212 may be based at least in part on sensor data from another sensor 212. For example, sensor data from a camera sensor 212 may comprise location metadata based on sensor data from the GPS sensor 212, as well as potentially other contextual metadata.

Acquiring the sensor data from the plurality of sensors 212 may include acquiring or receiving the sensor data from a buffer or memory of the particular sensor 212 or acquiring the sensor data from a bus or communications pathway connected to the sensors 212. Acquiring the sensor data may comprise storing the sensor data in data storage 218 and/or in volatile memory.

Using the acquired sensor data, the data processing module 226 may determine, for each portion of the sensor data, a value. In other words, the data processing module 226 may assign a corresponding value to each portion of the sensor data. The value for a given portion of sensor data may be determined by applying one or more rules to the sensor data, by applying a machine learning model to the sensor data, or by another approach. The rules and/or machine learning model may be configured to assign a higher value to portions of sensor data deemed more valuable or relevant to a larger data corpus. For example, an entity may desire to expand a data corpus to include instances of sensor data identifying particular objects, captured under particular conditions (e.g., at a particular location, in particular weather conditions, on a particular type of road or travel path, etc.). The rules and/or machine learning model may be configured to assign higher values to sensor data corresponding to these particular conditions. Accordingly, the value for a particular portion of sensor data may be based on one or more of: a location at which the sensor data was captured, a time at which the sensor data was captured, a type of road on which the sensor data was captured (e.g., highway, surface streets, etc.), weather conditions, traffic conditions (e.g., traffic density, traffic speed), one or more objects identified in the sensor data, one or more events detected in the sensor data, and/or other criteria.

Determining, for each portion of the sensor data, a value may comprise calculating, by the autonomous vehicle 100, the value for each portion of the sensor data. In other words, the values for the portions of sensor data are determined by the data processing module 226 of the autonomous vehicle 100. Determining, for each portion of the sensor data, a value may also comprise generating an index for the sensor data. The index may describe, for each portion of the sensor data reflected in the index, one or more criteria for which a value for a given portion of sensor data may be calculated (e.g., one or more portions of contextual metadata, one or more identified objects or events, etc.). The index may then be transmitted to a server 227 configured to calculate the value for each portion of the sensor data reflected in the index. The data processing module 226 may then receive, from the server 227, based on the index, the value for each portion of the sensor data. Using this approach, the computational burden associated with calculating the values for sensor data is offloaded to the server 227, requiring the data processing module 226 to only index the sensor data. Moreover, this allows for modifications to how values are assigned to sensor data by updating the rules or models used at the server 227 as opposed to pushing an update to rules or models to each automated vehicle 100 tasked with individually calculating the values for sensor data.

The data processing module 226 may then determine, based on the values for the sensor data, an upload policy. The upload policy defines one or more attributes for how sensor data will be transmitted to the server 227. For example, the upload policy may define an order for transmitting portions of sensor data, network connections to be used for transmitting sensor data, value or cost thresholds defining what portions of sensor data will be transmitted, etc.

Determining the upload policy may include determining an order for transmitting portions of the sensor data based on the values for the sensor data. For example, the order may be based on a descending order of values such that portions of sensor data with higher values are transmitted before portions of sensor data with lower values. Determining the upload policy may also include determining to exclude from transmission one or more portions of the sensor data. For example, determining the upload policy may include determining to exclude from transmission one or more portions of the sensor data having values below a threshold.

Determining the upload policy may also include determining a network connection to transmit a particular portion of sensor data. For example, portions of sensor data having a value above a threshold may be selected for transmission using a first available network connection, a highest bandwidth network connection or another network connection. Portions of sensor data having a value below the threshold may be selected for transmission using another network connection.

Determining the upload policy may also be based transmission costs for the portions of sensor data. The transmission cost for a given portion of sensor data reflects an amount of resources required to transmit that portion of sensor data. Such resources can include bandwidth resources, computational resources, financial resources, etc. Accordingly, the transmission costs for a given portion of sensor data may be an aggregate or weighted function of multiple resource usages associated with transmitting the portion of sensor data. A given portion of sensor data may be associated with multiple transmission costs each based on a network connection that may be used to transmit that portion of sensor data. For example, a given portion of sensor data may have a lower transmission cost on a higher bandwidth network connection and a higher transmission cost on a lower bandwidth network connection, as the given portion of sensor data would require proportionally less bandwidth on the higher bandwidth connection. As another example, a given portion of sensor data may have a lower transmission cost on a WiFi network connection and a higher transmission cost on a cellular network connection as the cellular network connection may have associated data caps or data transfer fees. A given portion of sensor data may also be associated with multiple transmission costs based on times of day (e.g., time windows) at which the sensor data may be transmitted.

Accordingly, determining the upload policy may comprise weighing the values for the sensor data based on the corresponding transmission costs. Determining the upload policy may also comprise selecting portions of sensor data for transmission in order to maximize the total value of the transmitted sensor data while minimizing corresponding transmission costs (e.g., maximizing values while having transmission costs fall below a threshold). Determining the upload policy may also comprise excluding from transmission portions of sensor data having transmission costs meeting a threshold.

The data processing module 226 may then transmit, based on the upload policy, one or more portions of the sensor data to a server 227. Transmitting the one or more portions of the sensor data to the server 227 may comprise transmitting the one or more portions of the sensor data in an order defined by the upload policy (e.g., ordered according to value, according to cost, etc.). Transmitting the one or more portions of the sensor data may comprise excluding, based on the upload policy, a first one or more portions of the sensor data from transmission and transmitting, based on the upload policy, a second one or more portions of the sensor data from the server. For example, the first one or more portions of sensor data excluded from transmission may have values falling below a threshold, while the second one or more portions of sensor data have values meeting the threshold.

As another example, the first one or more portions of the sensor data excluded from transmission may be determined based on a transmission cost associated with the first one or more portions of the sensor data and one or more values corresponding to the first one or more portions of the sensor data. Accordingly, the first one or more portions of sensor data excluded from transmission may be excluded from sensor data (e.g., the second one or more portions) selected to maximize a value of the transmitted sensor data and/or minimize a transmission cost of the transmitted sensor data.

Where the upload policy dictates a particular network connection for transmitting the one or more portions of sensor data to the server, transmitting the one or more portions of the sensor data to the server may comprise transmitting a first one or more portions over a first network connection and transmitting a second one or more portions of the sensor data over a second network connection. Accordingly, the first network connection and/or the second network connection may be determined based on one or more of an available bandwidth, a transmission cost, or a time of day.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
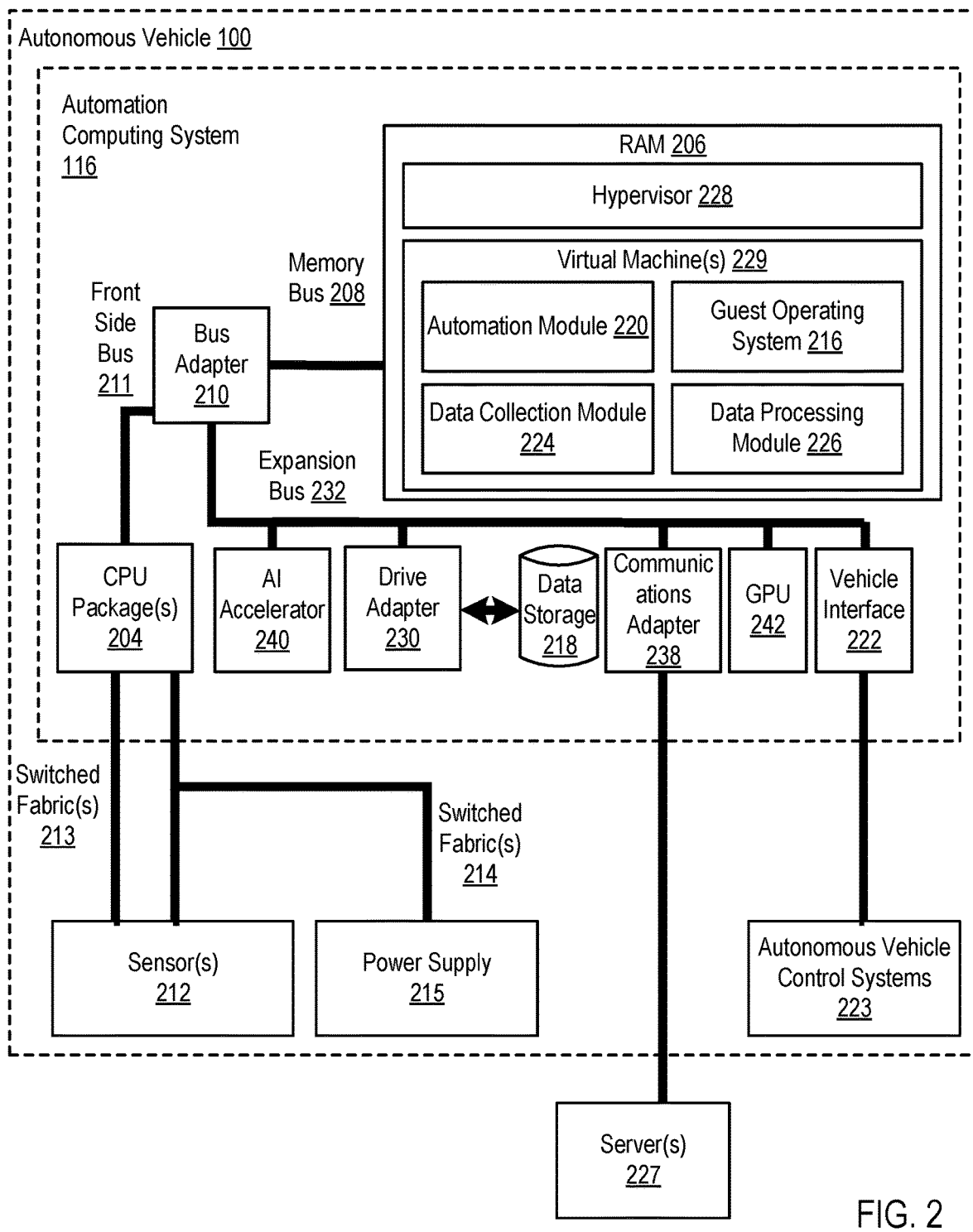
FIG. 2 is a block diagram of an autonomous computing system for value-based data transmission in an autonomous vehicle.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to processor(s) 204 and other components of the automation computing system 116. Disk drive adapter 230 connects non-volatile data storage to the automation computing system 116 in the form of data storage 213. Disk drive adapters 230 useful in computers configured for [PREAMBLE] according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for [PREAMBLE] according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed servers 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
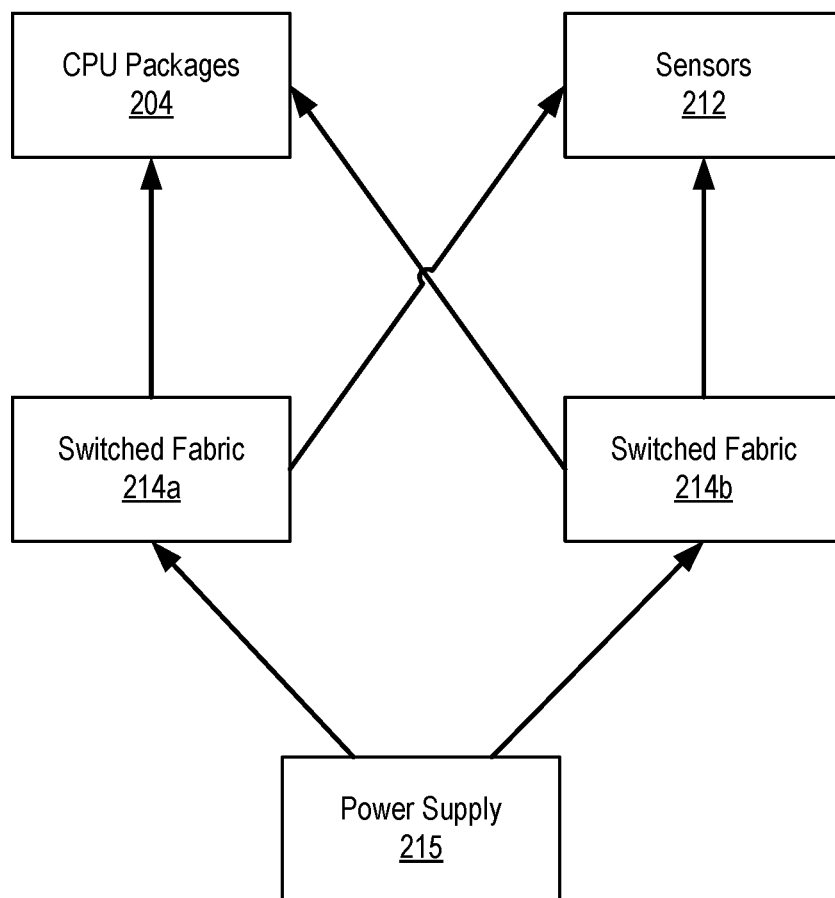
FIG. 3 is a block diagram of a redundant power fabric for value-based data transmission in an autonomous vehicle.

FIG. 3 shows an example redundant power fabric for value-based data transmission in an autonomous vehicle. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
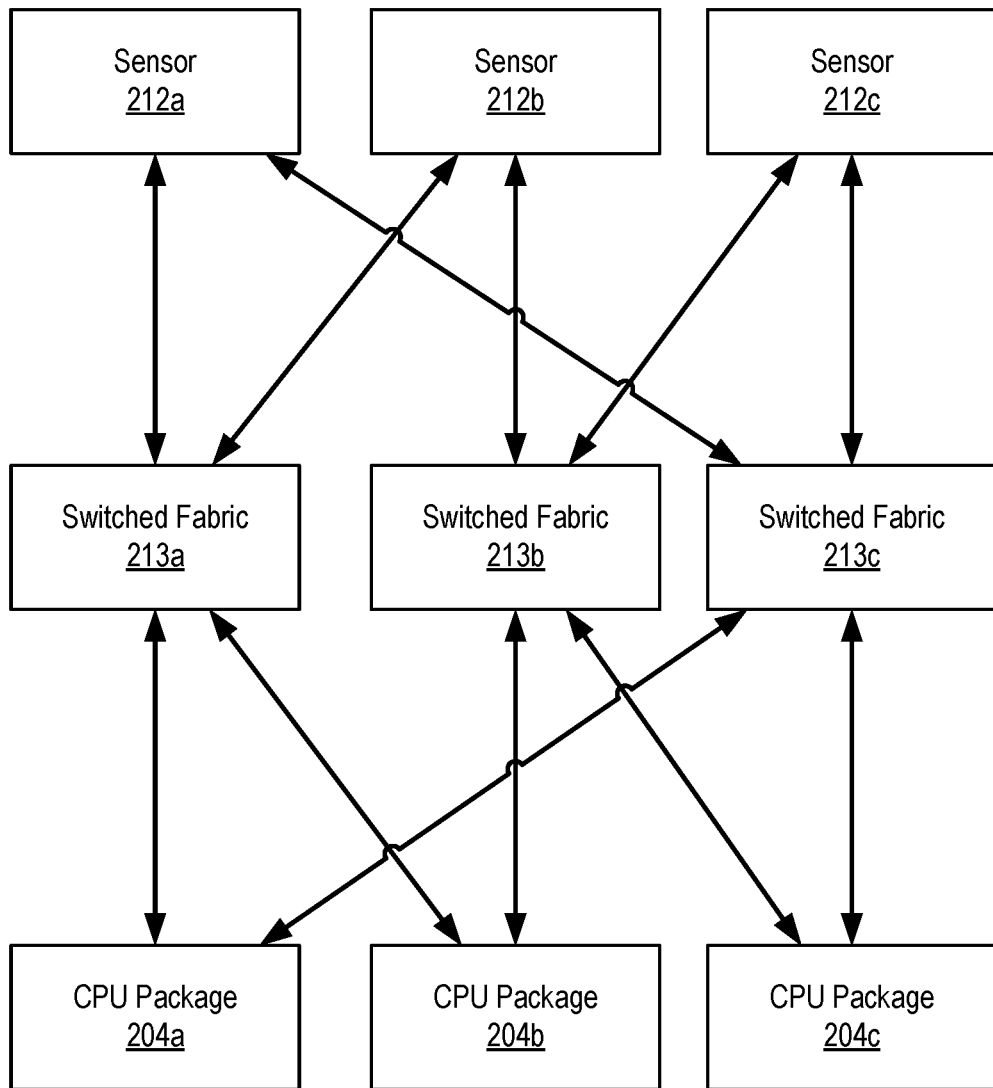
FIG. 4 is a block diagram of a redundant data fabric for value-based data transmission in an autonomous vehicle.

FIG. 4 is an example redundant data fabric for value-based data transmission in an autonomous vehicle. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
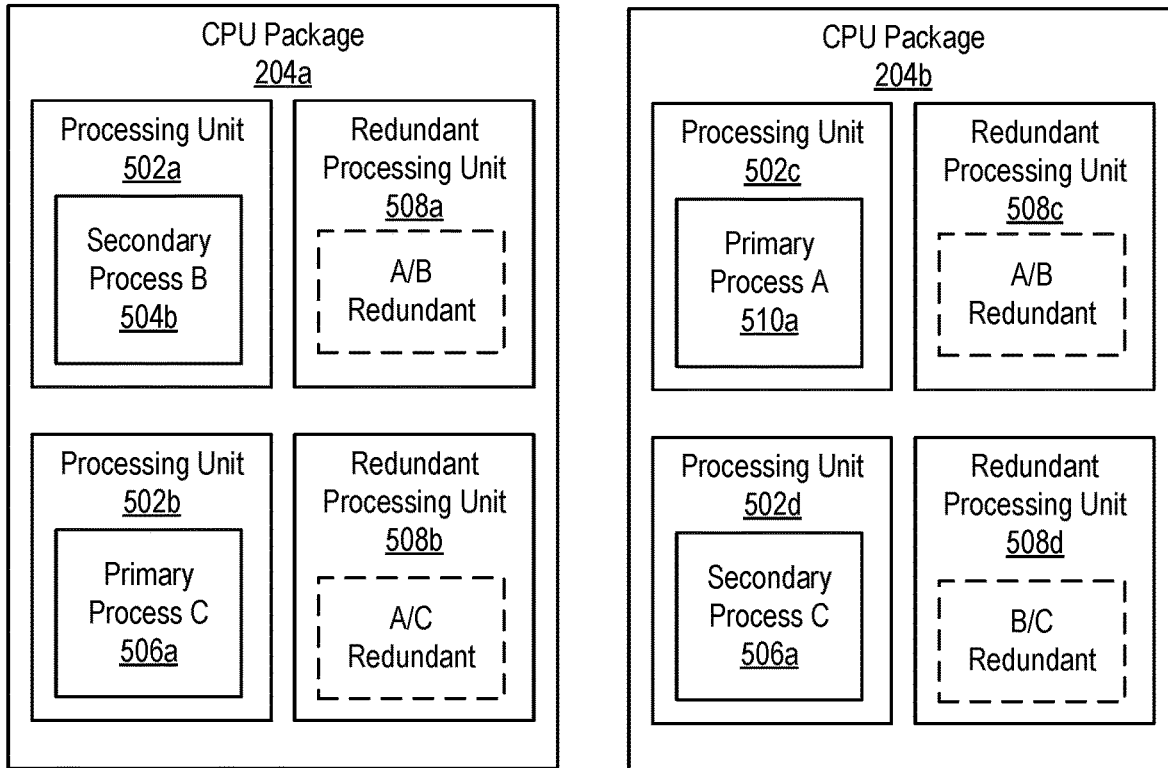
FIG. 5 is an example view of process allocation across CPU packages for value-based data transmission in an autonomous vehicle.
Figure 5:
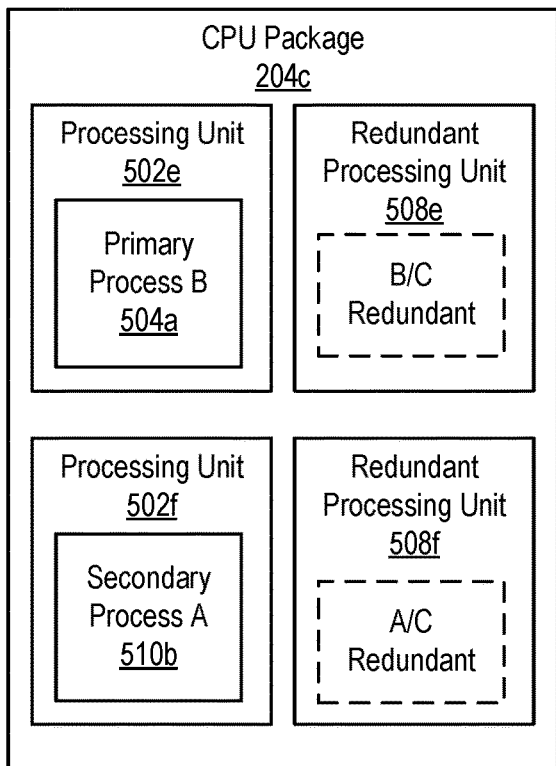

FIG. 5 is an example view of process allocation across CPU packages for value-based data transmission in an autonomous vehicle. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "AB redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "AB redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
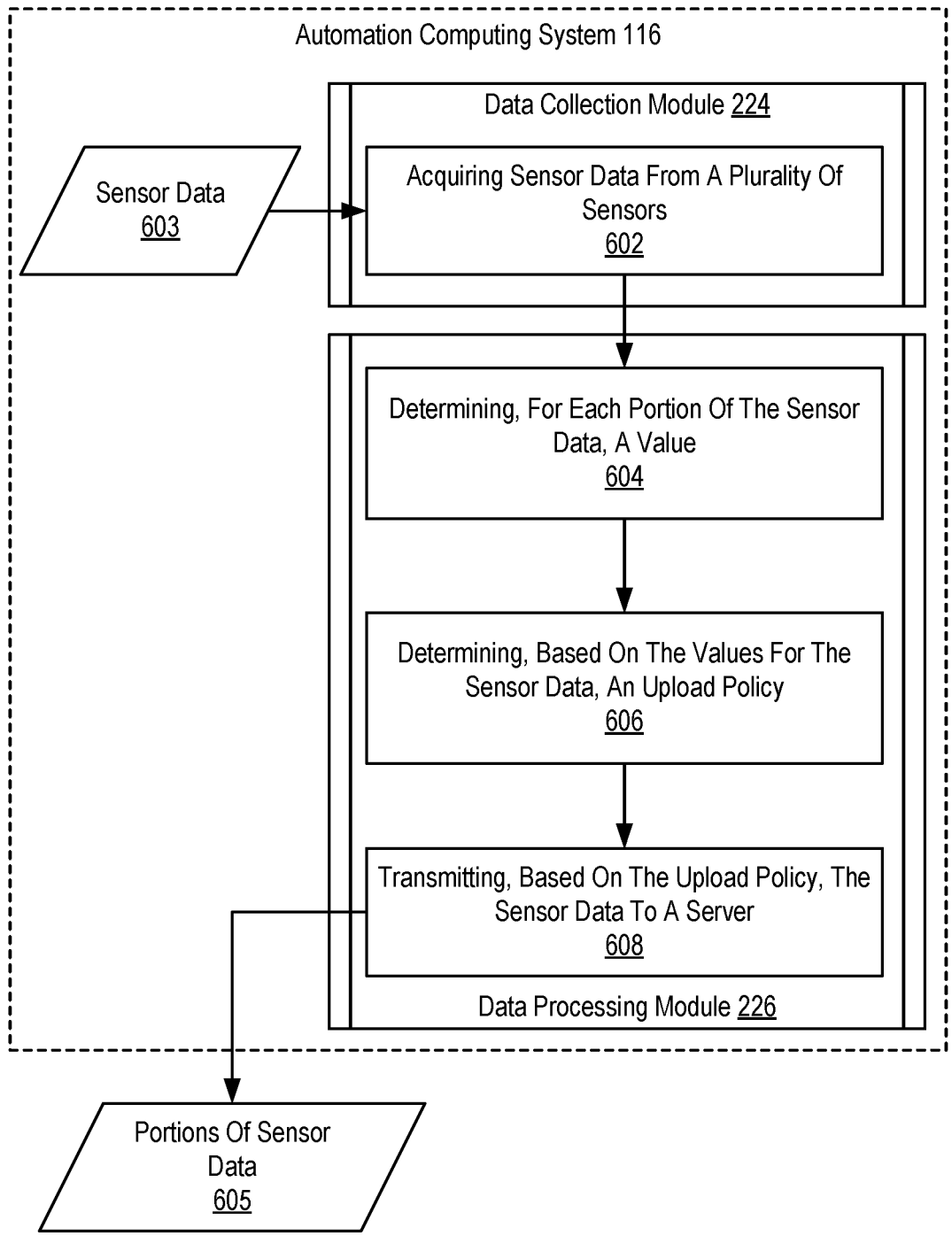
FIG. 6 is a flowchart of an example method for value-based data transmission in an autonomous vehicle.

For further explanation, FIG. 6 sets forth a flow chart illustrating an exemplary method for value-based data transmission in an autonomous vehicle that includes acquiring 602 (e.g., by a data collection module 224 of an automation computing system 116) sensor data 603 from a plurality of sensors (e.g., sensors 212 of an autonomous vehicle 100). The sensor data 603 may include image, audio, and/or video data from camera sensors 212, GPS data from a GPS radio sensor 212, acceleration data from an accelerometer sensor 212, or other sensor as can be appreciated. The sensor data 603 from a particular sensor 212 may comprise contextual metadata describing a time, location, or other information associated with a context in which the sensor data 603 was captured. The contextual metadata for a particular sensor 212 may be based at least in part on sensor data from another sensor 212. For example, sensor data 603 from a camera sensor 212 may comprise location metadata based on sensor data 603 from the GPS sensor 212, as well as potentially other contextual metadata.

Acquiring the sensor data 603 from the plurality of sensors 212 may include acquiring or receiving the sensor data 603 from a buffer or memory of the particular sensor 212 or acquiring the sensor data 603 from a bus or communications pathway connected to the sensors 212. Acquiring the sensor data 603 may comprise storing the sensor data 603 in data storage 218 and/or in volatile memory.

The method of FIG. 6 further comprises determining 604 (e.g., by a data processing module 226 of an automation computing system 116), for each portion of the sensor data 603, a value. In other words, the data processing module 226 may assign a corresponding value to each portion of the sensor data 603. The value for a given portion of sensor data 603 may be determined by applying one or more rules to the sensor data 603, by applying a machine learning model to the sensor data 603, or by another approach. The rules and/or machine learning model may be configured to assign a higher value to portions of sensor data 603 deemed more valuable or relevant to a larger data corpus. For example, an entity may desire to expand a data corpus to include instances of sensor data 603 identifying particular objects, captured under particular conditions (e.g., at a particular location, in particular weather conditions, on a particular type of road or travel path, etc.). The rules and/or machine learning model may be configured to assign higher values to sensor data corresponding to these particular conditions. Accordingly, the value for a particular portion of sensor data 603 may be based on one or more of: a location at which the sensor data 603 was captured, a time at which the sensor data 603 was captured, a type of road on which the sensor data 603 was captured (e.g., highway, surface streets, etc.), weather conditions, traffic conditions (e.g., traffic density, traffic speed), one or more objects identified in the sensor data 603, one or more events detected in the sensor data 603, and/or other criteria.

Determining, for each portion of the sensor data 603, a value may comprise calculating, by the autonomous vehicle 100, the value for each portion of the sensor data 603. In other words, the values for the portions of sensor data 603 are determined by the data processing module 226. The values for the portions of sensor data 603 may also be determined remotely (e.g., by a server 227) and received by the data processing module 226.

The method of FIG. 6 may further include determining 606 (e.g., by the data processing module 226), based on the values for the sensor data 603, an upload policy. The upload policy defines one or more attributes for how sensor data 603 will be transmitted to the server 227. For example, the upload policy may define an order for transmitting portions of sensor data 603, network connections to be used for transmitting sensor data 603, value or cost thresholds defining what portions of sensor data 603 will be transmitted, etc.

Determining the upload policy may include determining an order for transmitting portions of the sensor data 603 based on the values for the sensor data 603. For example, the order may be based on a descending order of values such that portions of sensor data 603 with higher values are transmitted before portions of sensor data 603 with lower values. Determining the upload policy may also include determining to exclude from transmission one or more portions of the sensor data 603. For example, determining the upload policy may include determining to exclude from transmission one or more portions of the sensor data 603 having values below a threshold.

Determining the upload policy may also include determining a network connection to transmit a particular portion of sensor data 603. For example, portions of sensor data 603 having a value above a threshold may be selected for transmission using a first available network connection, a highest bandwidth network connection or another network connection. Portions of sensor data 603 having a value below the threshold may be selected for transmission using another network connection.

Determining the upload policy may also be based transmission costs for the portions of sensor data 603. The transmission cost for a given portion of sensor data 603 reflects an amount of resources required to transmit that portion of sensor data 603. Such resources can include bandwidth resources, computational resources, financial resources, etc. Accordingly, the transmission costs for a given portion of sensor data 603 may be an aggregate or weighted function of multiple resource usages associated with transmitting the portion of sensor data 603. A given portion of sensor data 603 may be associated with multiple transmission costs each based on a network connection that may be used to transmit that portion of sensor data 603. For example, a given portion of sensor data 603 may have a lower transmission cost on a higher bandwidth network connection and a higher transmission cost on a lower bandwidth network connection, as the given portion of sensor data 603 would require proportionally less bandwidth on the higher bandwidth connection. As another example, a given portion of sensor data 603 may have a lower transmission cost on a WiFi network connection and a higher transmission cost on a cellular network connection as the cellular network connection may have associated data caps or data transfer fees. A given portion of sensor data 603 may also be associated with multiple transmission costs based on times of day (e.g., time windows) at which the sensor data 603 may be transmitted.

Accordingly, determining the upload policy may comprise weighing the values for the sensor data 603 based on the corresponding transmission costs. Determining the upload policy may also comprise selecting portions of sensor data 603 for transmission in order to maximize the total value of the transmitted sensor data 603 while minimizing corresponding transmission costs (e.g., maximizing values while having transmission costs fall below a threshold). Determining the upload policy may also comprise excluding from transmission portions of sensor data 603 having transmission costs meeting a threshold.

The method of FIG. 6 further comprises transmitting 606 (e.g., by the data processing module 226), based on the upload policy, one or more portions 605 of the sensor data 603 to a server 227. Transmitting the one or more portions of the sensor data 603 to the server 227 may comprise transmitting the one or more portions of the sensor data 603 in an order defined by the upload policy (e.g., ordered according to value, according to cost, etc.). Transmitting the one or more portions of the sensor data 603 to the server 227 may comprise transmitting the one or more portions of the sensor data 603 according to a particular network connection defined in the upload policy. Transmitting the one or more portions of the sensor data 603 to the server 227 may comprise transmitting a subset of the sensor data 603 satisfying one or more conditions (e.g., having a value above a threshold, being included in a selection of sensor data 603 for maximizing value and/or minimizing cost, etc.)

Figure 7:
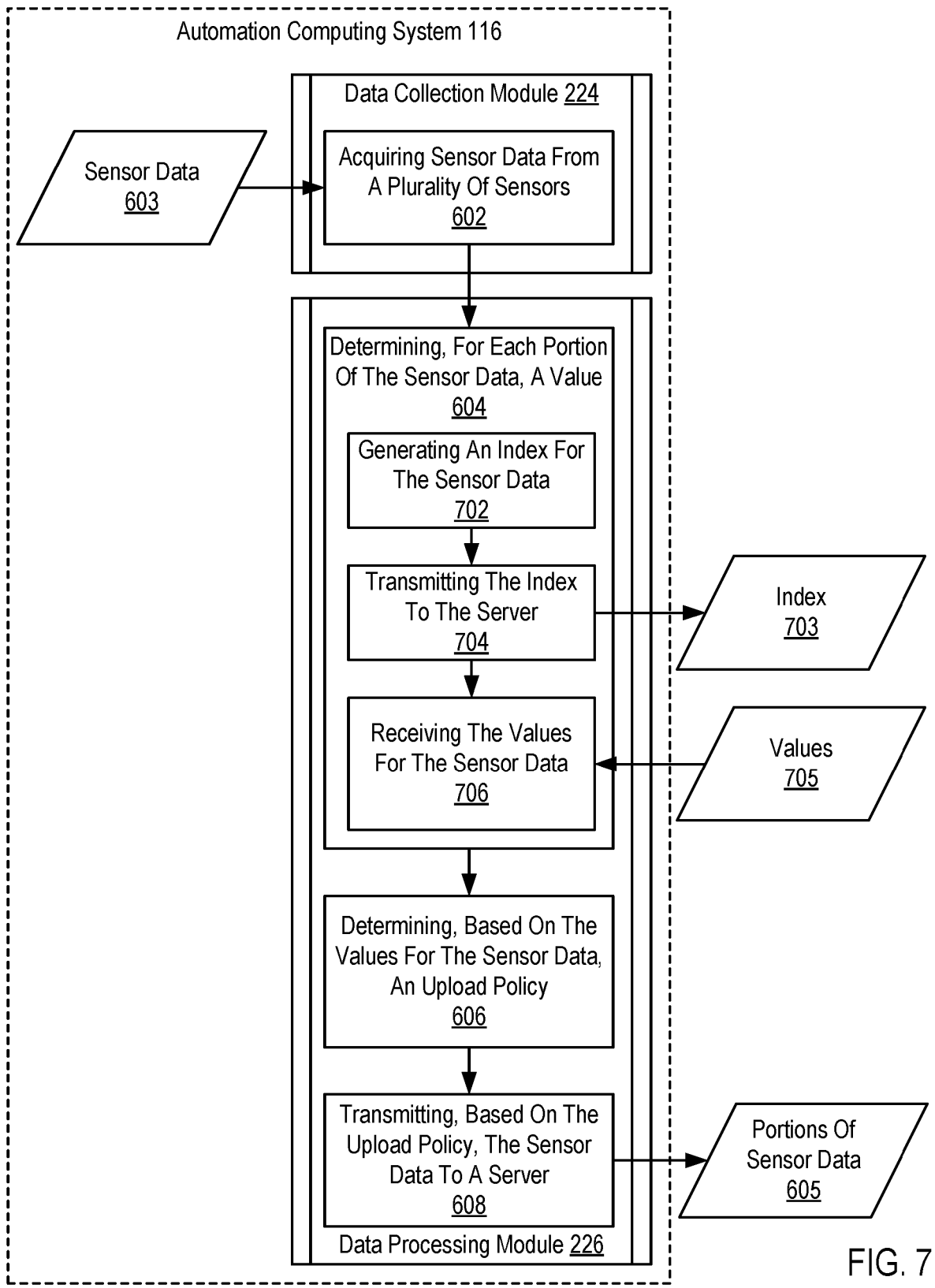
FIG. 7 is a flowchart of an example method for value-based data transmission in an autonomous vehicle.

For further explanation, FIG. 7 sets forth a flow chart illustrating an exemplary method for value-based data transmission in an autonomous vehicle that includes acquiring 602 sensor data 603 from a plurality of sensors; determining 604 for each portion of the sensor data 603, a value; determining 606, based on the values for the sensor data, an upload policy; and transmitting 608 based on the upload policy, one or more portions of the sensor data 603 to a server 227.

FIG. 7 differs from FIG. 6 in that determining 604, for each portion of the sensor data 603, a value comprises generating 702 an index 703 for the sensor data 603. The index 703 may describe, for each portion of the sensor data 603 reflected in the index 703, one or more criteria for which a value for a given portion of sensor data 603 may be calculated (e.g., one or more portions of contextual metadata, one or more identified objects or events, etc.).

The method of FIG. 7 further differs from FIG. 6 in that determining 604, for each portion of the sensor data 603, a value further comprises transmitting 704 the index 703 to the server 227. The server 227 is configured to calculate the values 705 for the sensor data 603 reflected in the index 703. The method of FIG. 7 further differs from FIG. 6 in that determining 604, for each portion of the sensor data 603, a value further comprises receiving 706, from the server 227, the values 705 for the sensor data 707.

Figure 8:
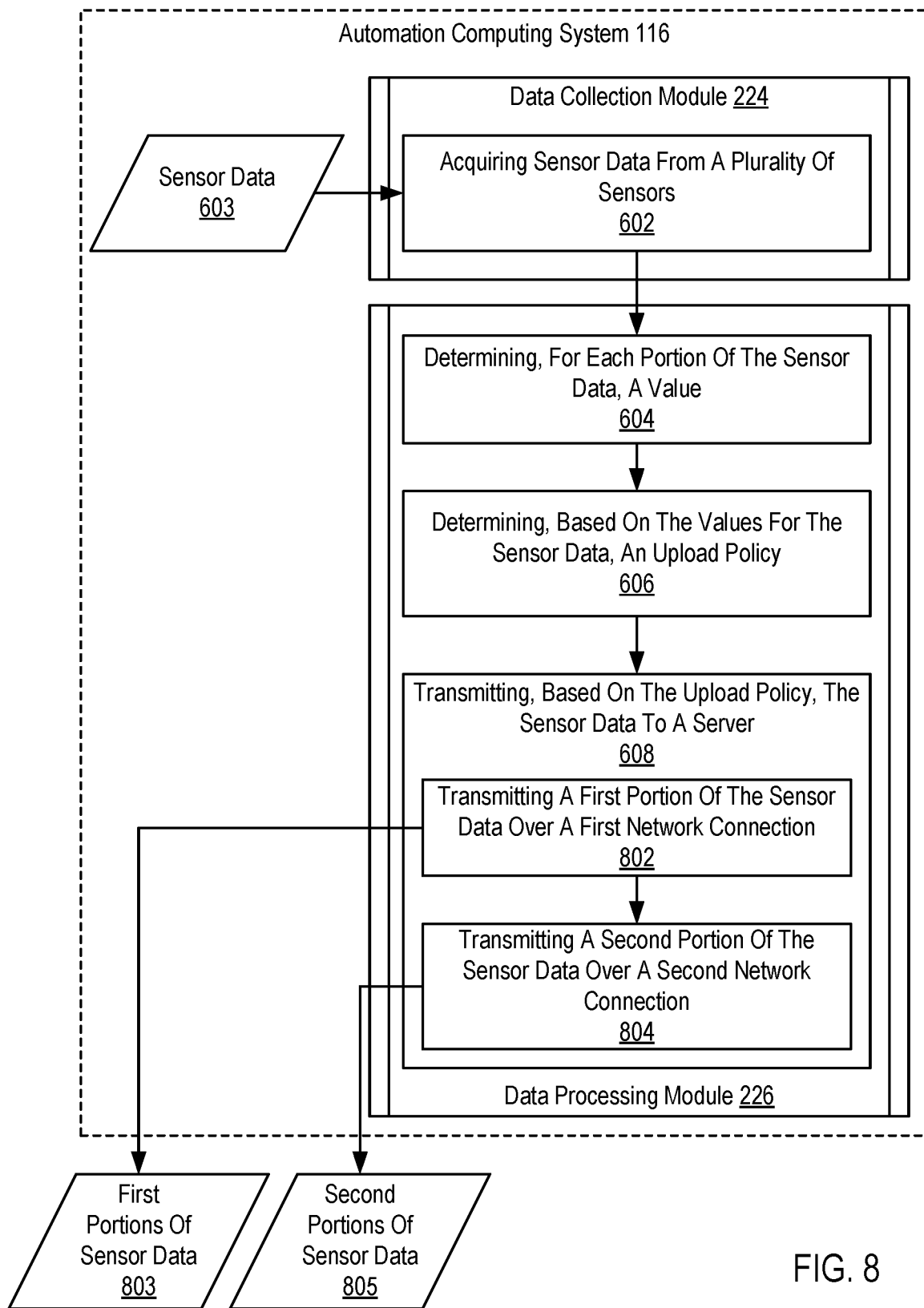
FIG. 8 is a flowchart of an example method for value-based data transmission in an autonomous vehicle.

For further explanation, FIG. 8 sets forth a flow chart illustrating an exemplary method for value-based data transmission in an autonomous vehicle that includes acquiring 602 sensor data 603 from a plurality of sensors; determining 604 for each portion of the sensor data 603, a value; determining 606, based on the values for the sensor data, an upload policy; and transmitting 608 based on the upload policy, one or more portions of the sensor data 603 to a server 227.

FIG. 8 differs from FIG. 6 in that transmitting 608, based on the upload policy, one or more portions of sensor data to the server 227 comprises transmitting 802 a first one or more portions 803 of sensor data 603 over a first network connection and transmitting 804 a second one or more portions 805 of sensor data 603 over a second network connection. Accordingly, the first network connection and/or the second network connection may be determined based on one or more of an available bandwidth, a transmission cost, or a time of day.

Figure 9:
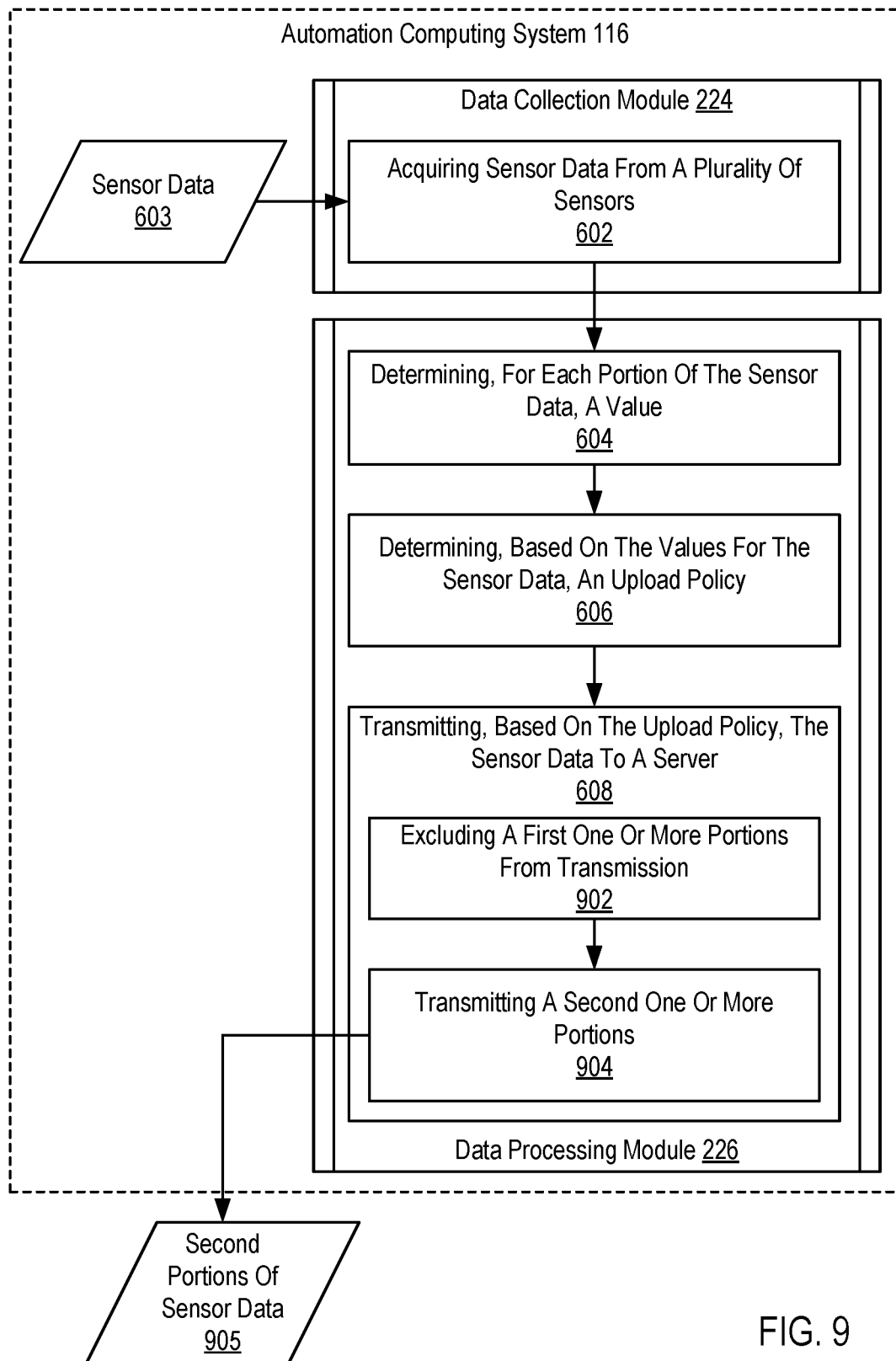
FIG. 9 is a flowchart of an example method for value-based data transmission in an autonomous vehicle.

For further explanation, FIG. 9 sets forth a flow chart illustrating an exemplary method for value-based data transmission in an autonomous vehicle that includes acquiring 602 sensor data 603 from a plurality of sensors; determining 604 for each portion of the sensor data 603, a value; determining 606, based on the values for the sensor data, an upload policy; and transmitting 608 based on the upload policy, one or more portions of the sensor data 603 to a server 227.

FIG. 9 differs from FIG. 6 in that transmitting 608, based on the upload policy, one or more portions of sensor data to the server 227 comprises excluding 902, based on the upload policy, a first one or more portions of the sensor data 603 from transmission and transmitting 904, based on the upload policy, a second one or more portions 905 of the sensor data 603 to the server 227. For example, the first one or more portions of sensor data excluded from transmission may have values falling below a threshold, while the second one or more portions 905 of sensor data 603 have values meeting the threshold.

As another example, the first one or more portions of the sensor data 603 excluded from transmission may be determined based on a transmission cost associated with the first one or more portions of the sensor data 603 and one or more values corresponding to the first one or more portions of the sensor data. Accordingly, the first one or more portions of sensor data 603 excluded from transmission may be excluded from sensor data (e.g., the second one or more portions 905) selected to maximize a value of the transmitted sensor data and/or minimize a transmission cost of the transmitted sensor data 603.

In view of the explanations set forth above, readers will recognize that the benefits of value-based data transmission in an autonomous vehicle according to embodiments of the present invention include:

- Reduced computational, network, and storage resources used by selectively filtering sensor data for transmission.
- Sensor data can be selected for transmission to maximize actual or perceived value of the selected sensor data.
- Sensor data can be selected to minimize associated transmission costs while maximizing received value.

Exemplary embodiments of the present invention are described largely in the context of a fully functional computer system for value-based data transmission in an autonomous vehicle. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    acquiring sensor data from a plurality of sensors of an autonomous vehicle, wherein the sensor data comprises a plurality of portions and the plurality of sensors comprises at least two cameras;
    determining, for each portion of the sensor data, a transmission cost and a value based on one or more conditions under which the sensor data was captured, wherein the one or more conditions comprise whether the sensor data was captured on a highway or a surface street;
    determining, based on the values and the transmission costs for the sensor data, an upload policy; and
    transmitting, based on the upload policy, one or more portions of the sensor data to a server.

2. The method of claim 1, wherein the one or more conditions comprise weather conditions during capture of the sensor data.

3. The method of claim 1, wherein the one or more conditions comprise traffic conditions during capture of the sensor data.

4. The method of claim 1, wherein the one or more conditions comprise one or more events detected during capture of the sensor data.

5. The method of claim 1, wherein each portion of the sensor data is captured by a different sensor of the plurality of sensors.

6. The method of claim 1, wherein each portion of the sensor data is captured at a different time.

7. The method of claim 1, wherein each portion of the sensor data corresponds to a different captured image.

8. The method of claim 1, wherein determining, for each portion of the sensor data, the value is based on one or more models.

9. The method of claim 1, wherein transmitting the one or more portions of the sensor data to the server comprises determining a transmission order of the one or more portions of the sensor data.

10. The method of claim 1, wherein the sensor data comprises video data and wherein the value for each portion of the sensor data is further based on one or more objects identified in the video data.

11. The method of claim 1, wherein determining the value for each portion of the sensor data comprises:
    generating an index for the sensor data, wherein the index describes, for each portion of the sensor data, the one or more conditions under which the sensor data was captured;
    transmitting the index to a server; and
    receiving, based on the index, the value for each portion of the sensor data.

12. An apparatus configured to perform steps comprising:
    acquiring sensor data from a plurality of sensors of an autonomous vehicle, wherein the sensor data comprises a plurality of portions and the plurality of sensors comprises at least two cameras;
    determining, for each portion of the sensor data, a transmission cost and a value based on one or more conditions under which the sensor data was captured, wherein the one or more conditions comprise whether the sensor data was captured on a highway or a surface street;
    determining, based on the values and the transmission costs for the sensor data, an upload policy; and
    transmitting, based on the upload policy, one or more portions of the sensor data to a server.

13. The apparatus of claim 12, wherein the one or more conditions comprise weather conditions during capture of the sensor data.

14. The apparatus of claim 12, wherein the one or more conditions comprise traffic conditions during capture of the sensor data.

15. The apparatus of claim 12, wherein the one or more conditions comprise one or more events detected during capture of the sensor data.

16. The apparatus of claim 12, wherein each portion of the sensor data is captured by a different sensor of the plurality of sensors.

17. The apparatus of claim 12, wherein each portion of the sensor data is captured at a different time.

18. The apparatus of claim 12, wherein each portion of the sensor data corresponds to a different captured image.

19. The apparatus of claim 12, wherein determining, for each portion of the sensor data, the value is based on one or more models.

20. A computer program product comprising a non-transitory computer readable medium, the computer program product comprising computer program instructions that, when executed, cause a computer system to carry out the steps of:
- acquiring sensor data from a plurality of sensors of an autonomous vehicle, wherein the sensor data comprises a plurality of portions and the plurality of sensors comprises at least two cameras;
- determining, for each portion of the sensor data, a transmission cost and a value based on one or more conditions under which the sensor data was captured, wherein the one or more conditions comprise whether the sensor data was captured on a highway or a surface street;
- determining, based on the values and the transmission costs for the sensor data, an upload policy; and
- transmitting, based on the upload policy, one or more portions of the sensor data to a server.

\* \* \* \* \*